E. P. GARDINER.
APPARATUS FOR DESULPHURIZING AND AMALGAMATING ORES.
No. 45,991.            Patented Jan. 24, 1865.
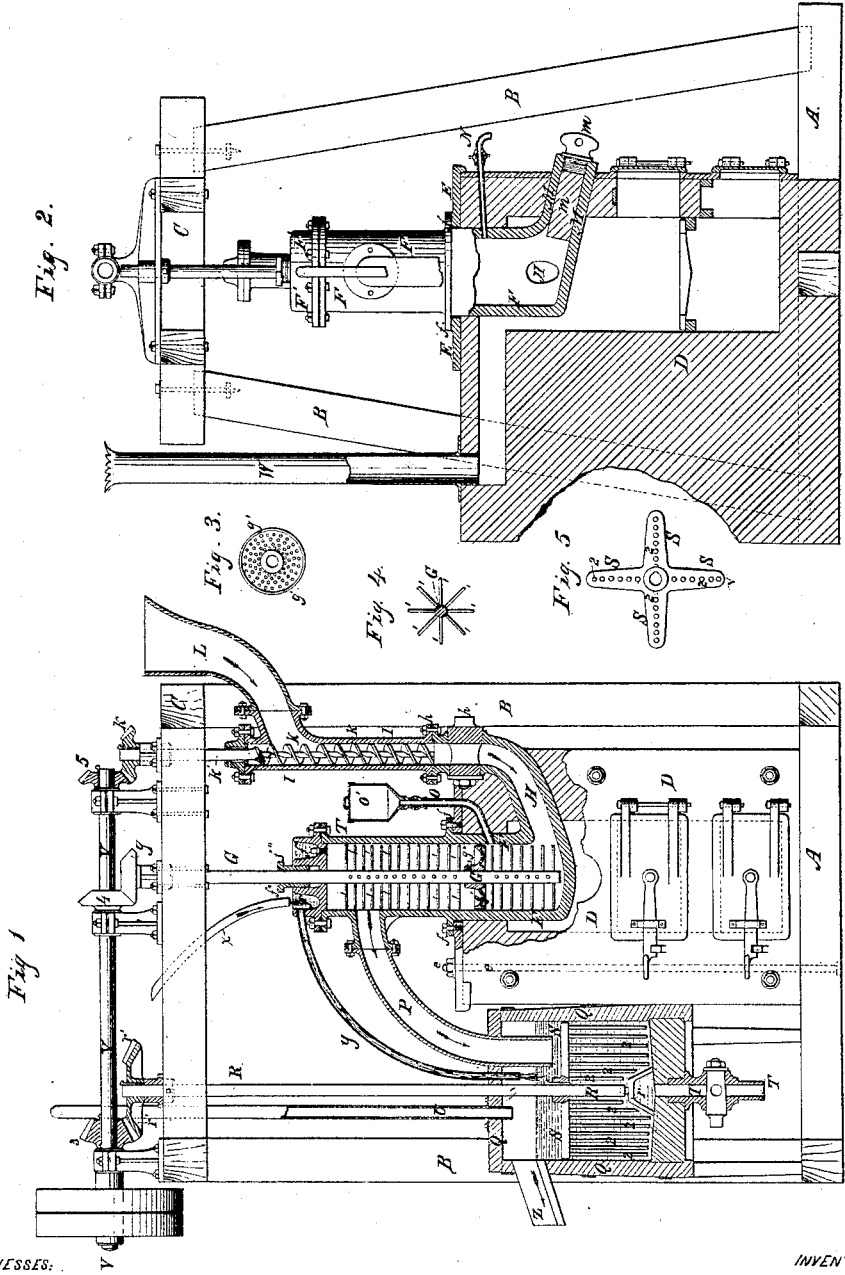

UNITED STATES PATENT OFFICE.

ELI P. GARDINER, OF NEW YORK, N. Y.

IMPROVED APPARATUS FOR DESULPHURIZING AND AMALGAMATING ORES.

Specification forming part of Letters Patent No. 45,991, dated January 24, 1865.

*To all whom it may concern:*

Be it known that I, ELI P. GARDINER, of the city, county, and State of New York, have invented certain new and useful improvements in apparatus and machinery for separating and desulphurizing and amalgamating the dust of ores of the precious metals, more especially of silver and gold; and I do hereby declare that the following is a full and exact description of my said improvements and machinery, reference being had to the drawings accompanying and making part of this specification.

In the drawings, Figure I is a vertical cross-section through the apparatus and machinery near to its central line in the direction of its longest sides, and it shows also a part of the heating-furnace and the furnace-doors in front elevation. Fig. II represents an end elevation of the apparatus and furnace, a part of the brick-work being left open, showing a part of the vessel for holding the mercury, in section, at right angles to section of Fig. I.

Some parts of the apparatus are represented in detail in the figures, which will be particularly referred to in the specification.

In all the figures the same letters represent the same parts.

The object of my invention is to introduce the dust of the pulverized ores into the chamber or vessel containing the mercury in such a manner that while the dust is forced into the body of the mercury at the bottom of the vessel, so that it must pass upward through the mercury, both the mercury and the dust are subjected at the same time to a thorough and rapid agitation together, so that every part of the dust becomes subject to contact with the mercury in the process before leaving the vessel in which the mercury is contained, the metallic parts being amalgamated with the mercury and the refuse or earthy parts being separated; and, further, that the earthy matters so separated from the amalgam so formed all, by the continuous operation of the apparatus and machinery, be carried off at the top of the vessel containing the mercury as fast as is required, and deposited in a condensing-tub containing water, where the agitating and separating process is carried on and continued by the operation of the same machinery at a due degree of motion; and my further object is, where the ores are sulphurets, or in which the precious metals are combined with sulphur, to subject the dust to the operation and treatment of heated mercury and the vaporization of mercury by a similar agitation and mixing together in the same apparatus and by the same machinery, having a heating-furnace connected therewith, so that my separator and amalgamator may be used with or without heat, as the nature of the ores may render expedient, and is adapted to both purposes.

The nature of my invention consists in my apparatus and the manner of arranging and combining the parts of the same and of the operating machinery, so that the above-mentioned process of bringing the mercury and dust together, and thoroughly agitating and mixing the same is continuously carried on and effected, and the amalgamation and separation produced as well with the mercury in a heated state as when used cold.

The manner of constructing my apparatus and machinery is as follows: Upon a rectangular bed-plate, A, are erected the four frame pieces B. (Seen in the side elevation in Fig. I and in end elevation in Fig. II.) These frame-posts B approach near each other at the top, where they are secured by the horizontal cross-pieces C C in the form of what is called a "gallows-frame." Upon the bed-plate is erected the furnace D, which is in the drawings represented as made of brick; but it may be constructed altogether of iron. The front of the furnace and the furnace-doors are shown in Fig. I and its side elevation in Fig. II. Upon the top of the furnace is placed a strong iron plate, E, having an opening in the center for receiving the operating-vessel in which the mercury is placed and the dust subjected to its operation. This plate E is firmly secured in its place by bolts passing down to the bed-plate, one of which is shown in Fig. I in dotted lines at *e*, having at the head a nut and washer.

The operating-vessel F is a cast-iron hollow cylinder. (Shown in Fig. I in vertical cross-section through the center.) Upon its external sides is cast the projecting ear or flange *f*, extending all around it, by which it is sustained upon the iron plate E, and to which it is firmly fixed by bolts and nuts. The bottom of cylinder F is directly over the furnace, the heat from which acts directly upon the exterior surface of the bottom and also upon a portion of the sides of the cylinder F below its line of suspension at $f$. The cylinder must be placed so that its central axis shall be exactly vertical and perpendicular to the bed of the machine. The cylinder is provided with a cylinder-head, F', bolted firmly on it by bolts passing through flanges and secured by nuts. This head F' is constructed so as to have all around its upper surface a trough or basin for containing water, for purposes hereinafter described. The cylinder-head has an opening at the center, which opening is provided with a stuffing-box, $f'$, Fig. I.

Within the cylinder F is suspended shaft or spindle G, and which passes down through the stuffing-box $f'$ to near the bottom of the cylinder F, but does not touch the bottom. The upper part of the shaft G passes up through a cross timber, where it is hung and supported by means of a shoulder or swell upon the shaft, resting upon a hollow cylinder or journal-box placed within the timber to suspend and afford a bearing to the shaft.

Upon the head of the shaft is fixed the horizontal bevel-pinion $g$.

Upon the shaft G, and within the cylinder F, is fixed the diaphragm-plate $g'$, Fig. I. It is keyed to the shaft by a screw passing through its hub $g''$, and may be adjusted by this means slightly higher or lower upon the shaft. This plate is flanged at its edges so as to present a wider surface at its periphery than its inner parts, so as to turn easily within the cylinder and at the same time close the space between the periphery and the internal sides of the cylinder. The body of the plate is perforated with holes vertically, as shown in detail, Fig. III, in a top view. The point of suspension of the plate $g'$ is at the line of surface of the mercury within the chamber or cylinder F, as hereinafter described.

Upon the vertical shaft G, through its entire length within the cylinder F, are fixed horizontal pins or arms 1 1, which extend so as to nearly touch the sides of the cylinder. They are seen in surface-view in detail, Fig. IV. They are placed sufficiently near each other, in rows, to keep the contents of the cylinder in agitation when the shaft is put in rotation, as hereinafter described.

Upon the side of the cylinder F, at the bottom, and cast with it in the same casting, is the oblique pipe H, extending upward as far as the joint $h$, where it meets and is united with the vertical pipe I, of the same diameter. At the top of the pipe H is provided a faucet, $h'$, by which communication with the cylinder F may be opened or closed at pleasure. The head of pipe I extends up nearly to the cross-top timber of the frame. The head has an opening in the center, in which is a journal-box for a bearing for a shaft.

Within the vertical feed-pipe I is suspended the endless screw or worm K, fast at the top to the shaft K', which is suspended in a bearing and journal-box by a shoulder or swell within the cross-top frame-piece, and on the head of which shaft is the horizontal bevel-pinion $k$, by which it is to receive rotation, as hereinafter described. A feeding-trough or funnel, L, Fig. I, is attached to the vertical pipe I and opening into it, by which the pulverized ore or dust is fed into the apparatus. The pipe H should be surrounded by the brick-work, or otherwise protected, so that the heat from the furnace will not act upon it.

Upon the front of the cylinder F, at the bottom and at right angles to the pipe H, is cast emptying-pipe M, Fig. II, which is closed by a stopper of fire-clay, $m$, attached to a metallic screw, by which it is removable.

A pipe, N, Fig. II, communicates with the interior cylinder just below the surface of the mercury, and which pipe is provided, near its outer end, with a faucet. This pipe is to gage the height of the mercury and ascertain the diminution by evaporation or otherwise, as hereinafter described.

Upon the side of the cylinder F is the vertical and bent pipe $o$, Fig. I, and having at the top a chamber or reservoir, $o'$, for holding a supply of mercury. The pipe $o$ is provided with a faucet by which the mercury may be fed into the cylinder when required. Upon the side of the cylinder opposite to the feed-pipe I is the eduction pipe P, its upper end being placed near the top of the cylinder. By this the contents of the cylinder are worked off by the operation of the apparatus and machinery, and carried into the condensing-tub Q, which, with the pipe P, communicates at its lower extremity, just below the surface of the water with which the condensing-tub is kept filled. The condensing-tub Q is a close-covered cylindrical vessel, usually of wood.

Within this cylindrical vessel or tub is placed the vertical shaft R, Fig. I, having its lower bearing upon a pedestal in the center of the bottom of the tub $r$. This shaft extends upward through a bearing in the cross frame-piece, and has fast upon its head the horizontal bevel-wheel $r'$. Upon the shaft R are fast the horizontal arms S, of about the same diameter as the tub, and they are placed at a point just below the surface of the water in the tub.

Upon the under side of the arms are fixed the vertical pins 2 2, in number sufficient to keep the water and pulp in agitation when put in motion by the shaft. These arms and pins are shown in plan view in detail, Fig. V. At the bottom of the tub is the pipe T, provided with a faucet for drawing off the contents of the tub.

U is a pipe for carrying off any offensive or injurious vapor or gases from the tub.

The three shafts R G K' and their attachments are driven by a horizontal driving-shaft, V, having upon it the bevel-weels 3 4 5, geared into $r'$ $g$, and $k$, respectively, the shafts G and K' having the same speed of rotation, but the shaft R has only half the speed of G or K'. The horizontal driving-shaft V has its bearings on pedestals provided with journal-boxes upon the top frame-piece.

The furnace D is constructed with fire-chamber and ash-pit, each chamber being provided with doors, and the furnace is so arranged under and about the lower part of the cylinder F as to communicate the heat directly only upon that part of the cylinder in which the mercury to be heated is contained. The smoke is carried off through smoke-pipe or chimney W, Fig. II.

A supply of water is furnished through pipe $x$ into the trough or basin $f'$ on the head of cylinder F, and it is carried off as fast as it is supplied by the discharge-pipe $y$, which discharges the water into the condensing-tub. The trough or basin $f'$ is to be kept full of water, so as to prevent the heating of the head and stuffing-box. A hole is made in the basin or trough, which is closed by a removable plug, by means of which water may be let into the cylinder F to cleanse it, the water passing off through M when the plug $m$ is withdrawn, but if plug $m$ is in place and pipe M kept closed, then the water and earthy matters of the vessel F pass out over into the tub Q through pipe P, and after the earthy matters are all thus carried off the amalgam and mercury remaining in the bottom of the vessel F may be withdrawn through pipe M.

Having thus described the construction of my apparatus and machinery, I now proceed to describe the manner of operating and using the same.

And, first, as to the operating with mercury cold and without the use of the furnace: The vessel F is supplied with mercury, about one-third full, so as to reach to the diaphragm-plate $g'$. The pulverized ore or dust is poured into the funnel L. The driving-shaft V is put in rotation by the prime mover so as to give the vertical shafts G K' about two hundred revolutions per minute. By the operation of the endless screw K the dust is carried down the pipe H into the bottom of the vessel F. The revolution of the shaft G and the pins attached agitate and mix the mercury and the dust together in the most complete manner, so that every particle of precious metal may be brought in contact with the mercury, and this process of excessive agitation and mixing is carried on until the dust is carried out up to the upper part of the vessel F, where it is discharged through the discharge-pipe P into the condensing, or, as it may, in the cold process, be called, the "washing and separating-tub" Q, where the dust is again subjected to agitation and washing by the revolution of shaft R and the pins attached, and thereby all the metallic particles thoroughly separated and fall to the bottom of the tub, while the lighter particles of earthy matter are carried off by the action of the stream of water falling through pipe Y and by the rotation over the side of the tub by the trough Z. By this operation it is believed that the dust is so thoroughly and continuously, during the operation, subjected to contact and rubbing with and on the mercury that the metallic particles cannot fail to be separated from the earthy matters and amalgamated to a very great degree of completeness, and with rapidity, the agitating of the particles carried over into the washing-tub Q contributing to complete the separation of the metallic particles from the dust, if any should be carried over through pipe P, and by this means the operation of supply and discharge and amalgamating and mixing together are simultaneously and continuously carried on without intervals or stopping.

It should be observed that the perforations above described, in the diaphragm-plate $g$, permit the passage of the dust or pulp through them in the form of jets or small rills, but, nevertheless, broken up and in small masses; and if any mercury is carried with the earth it is in small, detached drops or jets, and were it not for the operation of the perforations in the plate the mercury and amalgam might, by the pressure and operation of the apparatus, be carried up in masses or large globules out of their appropriate place in the operating-vessel.

I now proceed to describe the manner of operating and using the apparatus with the mercury in a heated state.

When the ores are sulphurets it is extremly difficult to disengage the sulphur from the precious metal, except by a heat sufficient to decompose or vaporize the sulphur. It is therefore necessary to use heat in the process of separation and amalgamation. For this purpose my apparatus is adapted to heating the mercury to a degree sufficient to dissolve or vaporize the sulphur in the ores and to mixing the pulp or dust with the mercury so heated. The degree of heat required for the purpose of vaporizing and separating the sulphur is about 400° Fahrenheit. The heat is communicated to the vessel F from the furnace below, the mercury being introduced into the vessel, as before described, and to the same height in the vessel. The sulphur, being in contact with the heated mercury, becomes vaporized and decomposed, and passes through the perforations of the diaphragm-plate in the form of vapor, together with the fumes and vapors of the mercury and the earthy matters in the pulp or dust. The vapors and dust so carried into the upper part of vessel F are carried off by the eduction pipe P into the water in the tub Q, which now becomes a condensing-tub for the vapors thus carried into it. The stream of water in the trough $f'$ on the head of the vessel F now performs the useful office of keeping the head and the stuffing-box cold, which might otherwise become heated and the stuffing-box oxidized and destroyed by the hot fumes of the mercury and sulphur.

The machinery, vertical shafts, and pins attached, the endless screw or worm, and the feeding and discharge are all carried on and performed in the same manner as when the mercury is used cold. Care should be taken that the mercury does not get too low in the vessel by evaporization. It should always be kept at the proper height, and its surface-height may be always ascertained by opening the faucet in pipe N. If the pipe discharges mercury when the faucet is open, the quantity of mercury is sufficient in the vessel, but if vapor come out of the pipe, then the mercury is too low, and it must be supplied from the reservoir and pipe O' O, above described, which is provided with a faucet for the purpose of regulating the supply. The dust or pulp is subject to the same process of continuous agitating and mixing and rubbing with the mercury in its heated state as above described when the mercury is used cold.

This process is not for subjecting the dust or pulp to the action of heated mercury under pressure in a closed vessel, but, on the contrary, it is to subject the dust or pulp to agitation, and complete mixing up with the mercury in a heated state, and with the admission of external air constantly and combining the vapors of sulphur and mercury together by mixing and agitation in a vessel not closed, but admitting of the process and operation being carried on continuously by the apparatus and machinery, without stopping to feed or to discharge the matter under treatment. The agitating and mixing the vapors of the sulphur and mercury are performed in the vessel F above the diaphragm-plate $g'$.

The manner herein described of subjecting the heated mercury and the pulp or dust to the excessive and continuous agitation by a continued and progressive operation, within a vessel in which the air is also introduced, is far more effectual than when the mercury and dust are subjected to the operation of heat in a reverberating furnace, or a kettle, or other vessel, in successive charges and discharges, and the amalgamation and separation, whether the mercury is used cold or hot, are far more complete, regular, and performed with far greater results in the quantity of metal separated within a given time. The particles of mercury are brought into contact with the particles of pulp or dust, as it were, atom to atom, separately, and not in masses or aggregates, so that the mercury can act upon and touch each single particle or atom of dust, and thus amalgamate and separate every particle or atom of precious metal as the dust passes through the mercury in the manner and under the treatment described.

Having thus described the construction of my apparatus and machinery, and the manner of using and operating the same, what I claim as my invention thereon is—

1. The form and construction of the receiving and operating vessel F, by which it is adapted to the uses and purposes required and designed, as above described.

2. The vertical shaft and its attachments of pins and revolving perforated diaphragm-plate, combined, arranged, and operating within the vessel F in the manner and for the purposes described.

3. The combination and arrangement of the operating-vessel F, the feed-pipe, and endless screw I K, and eduction or discharge-pipe P, and the rotation of the shaft and attachments, as described, so as to effect a continuous and uninterrupted operation of the process, without stopping to charge or discharge the matters under treatment.

4. The combining and arranging the vessel F and the apparatus connected with it, and its contents, with the washing tub condenser or and separator by means of eduction-pipe P and water-pipe Y, operating together, as described.

5. Desulphurizing the dust and dissolving the sulphur therein contained by subjecting the same to treatment with heated mercury in a vessel in which the atmosphere or external air is admitted with the pulp, and uniting the fumes of the mercury with the fumes of the sulphur as they pass off, within a vessel arranged constructed and operating as described.

6. The construction of the water-trough in the head of the operating-vessel provided with a supply and discharge pipe, for keeping cool the head and stuffing-box, constructed, and arranged, and operating as described.

ELI P. GARDINER.

Witnesses:
J. B. STAPLES,
G. W. FOX.